March 17, 1964  W. E. THIERMANN  3,125,350
MULTI-PURPOSE COLLAPSIBLE DOLLY
Filed Oct. 11, 1960  2 Sheets-Sheet 1

INVENTOR.
WILLIAM E. THIERMANN
BY
Wheeler, Wheeler & Wheeler
ATTORNEYS

March 17, 1964 W. E. THIERMANN 3,125,350
MULTI-PURPOSE COLLAPSIBLE DOLLY
Filed Oct. 11, 1960 2 Sheets-Sheet 2
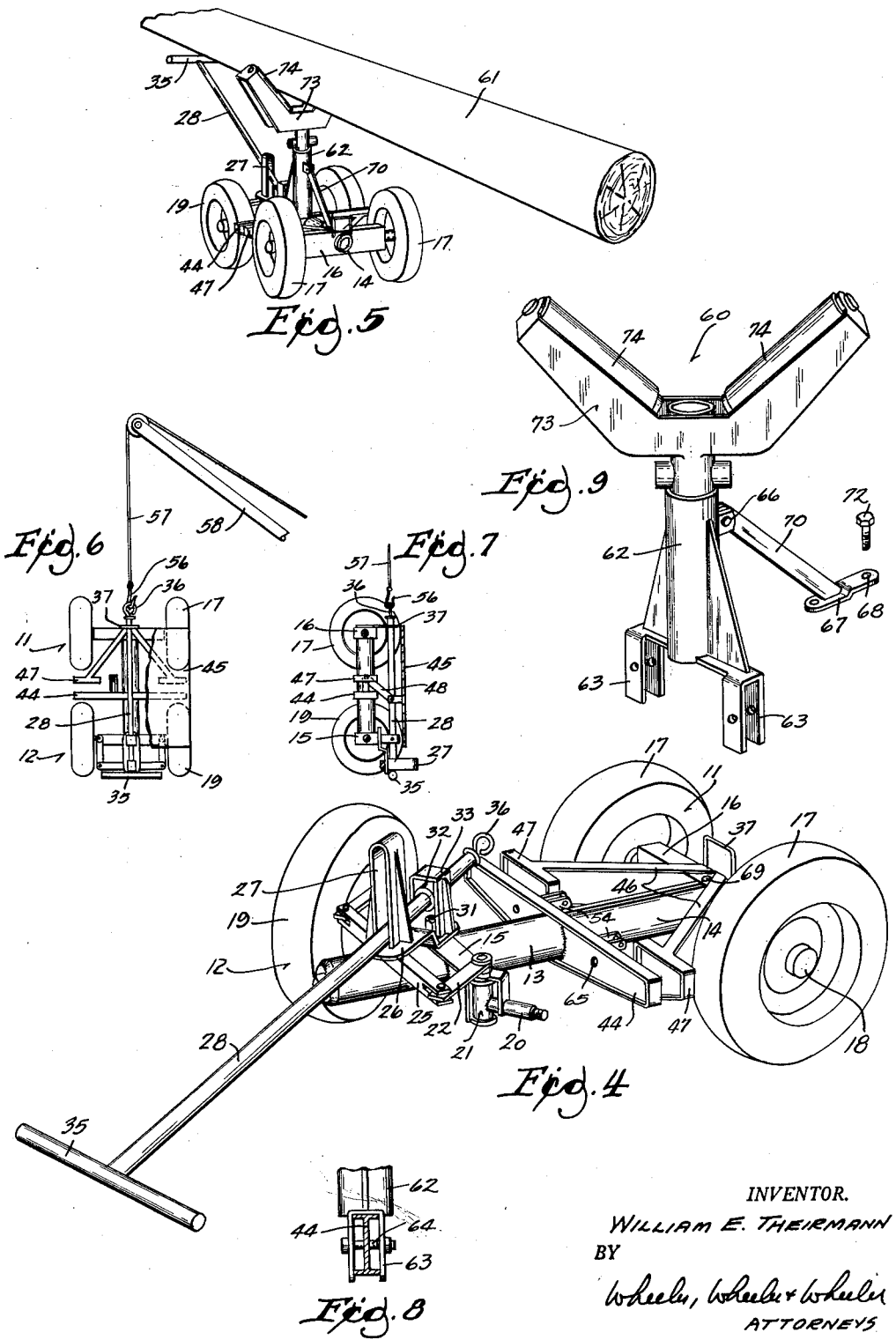
INVENTOR.
WILLIAM E. THIERMANN
BY
Wheeler, Wheeler & Wheeler
ATTORNEYS

United States Patent Office 3,125,350
Patented Mar. 17, 1964

3,125,350
MULTI-PURPOSE COLLAPSIBLE DOLLY
William E. Thiermann, Thiensville, Wis.
Filed Oct. 11, 1960, Ser. No. 61,905
7 Claims. (Cl. 280—34)

This invention relates to a multi-purpose collapsible dolly.

The dolly of the present invention is particularly adapted for use in transporting heavy, bulky, and unwieldy objects over terrain where it is not possible or practical to operate motor vehicles. Typical examples involve electric utility operations in which heavy substation equipment such as transformers and power line equipment such as utility poles must frequently be handled off the road on private property. In such instances manpower must necessarily be relied upon for transport of these heavy and bulky objects.

The collapsible dolly of the present invention greatly facilitates manual handling of such objects. The dolly is readily collapsible to be carried compactly on a motor truck which brings the object to the closest accessible place from which manual handling thereof must commence.

According to the present invention, the dolly has an extensible reach by which the length of the dolly can be easily adjusted, depending upon the specific use to which the dolly will be put. A transformer carrying deck and pole carrying cradle are provided for interchangeable use with the dolly in its extended and retracted positions. In both instances, the deck and cradle are fabricated so that they will help tie the extensibly related parts of the dolly together.

The structure of the dolly is such that when collapsed with the deck attached thereto, the deck is elevated on links to a position over the wheels of the dolly and in gravity bias thereagainst. In such collapsed position, the draw bar for the dolly may be retracted beneath the elevated deck so that the rear end of the draw bar can be used as a coupling to hang the collapsed dolly from a derrick cable, the various parts of the dolly being biased by gravity into compact relation when lifted by the derrick.

When the parts of the dolly are extended, the deck is swung downwardly to receive support from low slung frame members having a low center of gravity for great stability in the handling of heavy objects.

When collapsed, the deck may be removed and the cradle substituted therefor to adapt the dolly for transporting utility poles. The shortened wheelbase of the dolly thus achieved makes the dolly highly maneuverable.

Other objects, advantages and features of the invention will appear from the following disclosure in which:

FIG. 4 is a perspective view of the collapsed dolly with deck removed and in condition to receive a pole carrying cradle.

FIG. 5 is a perspective view on a smaller scale showing the dolly, pole cradle and a pole carried thereon.

FIG. 6 is a view on a small scale showing the collapsed dolly with elevated deck and retracted draw bar suspended from a truck crane cable.

FIG. 7 is a view similar to FIG. 6, but showing the dolly turned through 90°.

FIG. 8 is a detail showing the cradle mast leg attached to a frame beam.

FIG. 9 is a perspective view of the pole carrying cradle.

Figure 1:
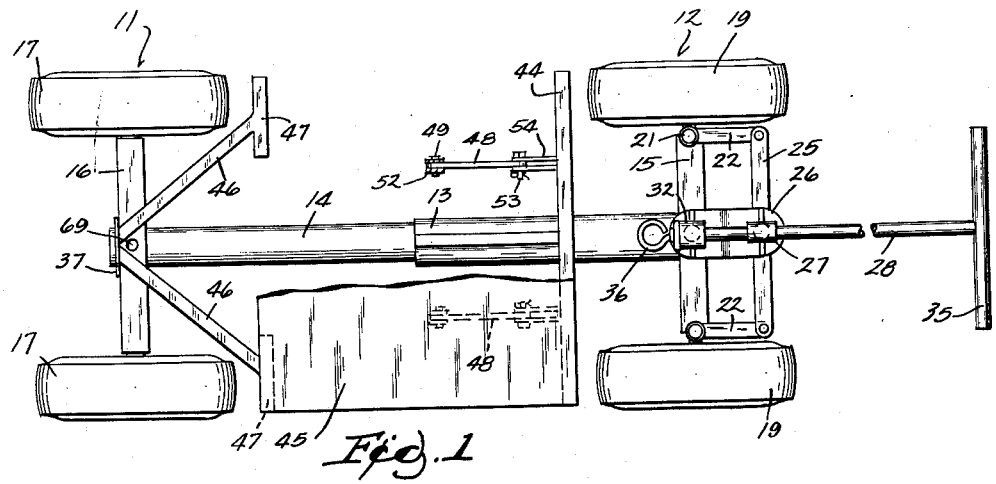
FIG. 1 is a plan view of a dolly embodying the invention, portions of the deck being broken away.

The dolly comprises a front frame 12 and a rear frame 11 interconnected by an extensible reach which desirably consists of telescopically related tubes 13, 14. The respective tubes are welded or otherwise securely fastened to the respective front and rear axles 15, 16 of the dolly.

The rear wheels 17 are mounted on axle 16 on shafts 18. The front wheels 19 are steerable and for this purpose have stub shafts 20 mounted on conventional king pin assemblies 21 to which steering arms 22 are fastened. The steering arms 22 are interconnected by tie rod 25 having a pivotal connection with a swing plate 26 which provides a base for a steering yoke 27. Draw bar 28 is slidable within the yoke 27.

Figure 2:
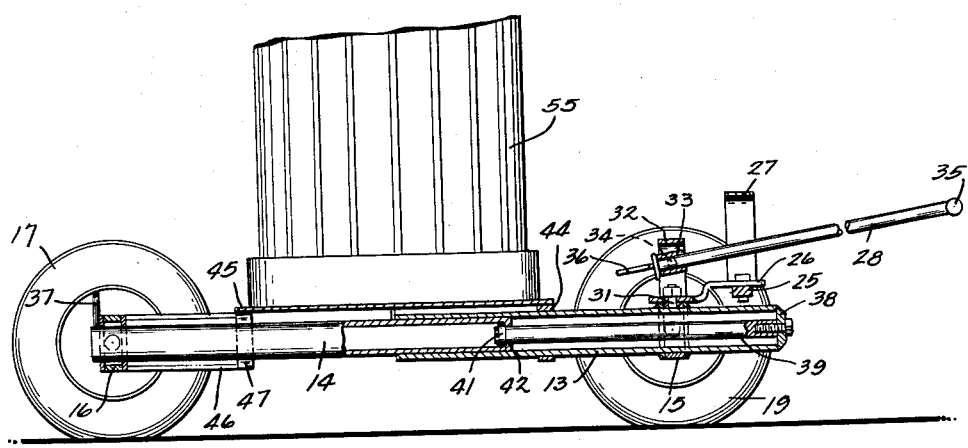
FIG. 2 is a side elevation of the device of FIG. 1, portions thereof being shown in cross section.

The plate 26 is pivotally mounted on pintle 31 to axle 15 (FIG. 2). Axially aligned with the pintle 31 is an anchor yoke 32 also mounted on plate 26. Between the legs of the yoke 32 and oscillatable on trunnions 34 is sleeve 33 through which draw bar 28 may slide for the purpose of retracting it to its position shown in FIGS. 6 and 7.

The outermost end of the draw bar 28 has a handle 35. Its innermost end has a ring 36 which will be received through the eye of a staple 37 connected to the rearmost end of reach tube 14, as hereinafter explained.

To the front end of reach tube 13 is welded an end cap 38 providing a screw anchorage for the internal rod 39 having a head 41 at its end opposite cap 38. Head 41 constitutes a stop against which end wall 42 on the reach tube 14 bottoms when the reach is completely extended to prevent separation thereof.

Reach tube 13 is provided with a transverse beam 44 to which the deck 45 for a transformer or the like is attached on swing links 48 as hereinafter described. The rear wheeled frame 11 of the dolly is provided with forwardly diverging cantilever beam arms 46 which terminate in transverse beam pads 47 which are substantially parallel to the beam 44, but which are spaced apart centrally of the dolly to avoid interference with the collapse thereof.

Deck 45 has flanged side margins 50 and is detachably connected to the dolly on swing links 48 which are pivotally connected on pins 49 to downwardly projecting ears 52 on the undersurface of deck 45. Opposite ends of the links 48 are pivotally connected on draw pins 53 to the ears 54 laterally projecting from the cross beam 44.

Figure 3:
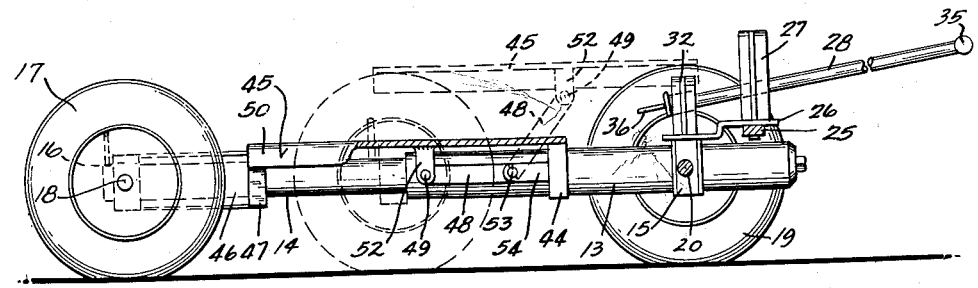
FIG. 3 is a view similar to FIG. 2, but showing in full lines the dolly with its reach extended and in broken lines the dolly with its reach retracted and the deck elevated.

When the reach parts 13, 14 are fully extended, as shown in full lines in FIGS. 1, 2 and 3, the deck 45 may be swung down to lowermost position in which it is supported directly on the beam portions 44, 47. Links 48 are horizontal as shown in FIG. 3. In this position the wheels 17, 19 are separated widely, the deck 45 is low slung and provides a stable support for a heavy object, such as the transformer 55, which may weigh several tons. In practice the dolly has been tested to carry 5,000 lbs. In this position the deck is only about ten (10) inches above ground level.

The dolly may with relative ease be drawn and turned manually and rolled on its wheels 17, 19 over terrain otherwise inaccessible to motor trucks.

After the load 55 or the like has been unloaded, the dolly can be collapsed to its position shown in dotted lines in FIG. 3 and in FIGS. 6 and 7. For this purpose the deck 45 is swung upwardly on its links 48 and the reach tube 14 retracted within reach tube 13, thus bringing the wheels 17, 19 and frames 11, 12 relatively close together. The deck 45 is elevated and links 48 are swung upwardly through an arc slightly greater than 90° to pass over center so that gravity will bias the deck 45 into abutment with the wheels. Moreover, draw bar 28 may be retracted beneath the elevated deck 45, as shown in FIGS. 6 and 7, so that the eye 36 at the rear end of the draw bar which is passed through the staple 37 is exposed at the rear of the dolly to be engaged by hook 56 on a hoist line 57 of a crane boom 58 of a motor truck. When the dolly is lifted as shown in FIGS. 6 and 7, all parts will be tied together under gravity bias of the deck 45, acting to engage frictionally the wheels 17, 19 and the gravity bias of the rear wheel frame 11 toward the front wheel frame 12. The weight is borne by the draw bar handle 35 which spans across the legs of yoke 27. In the absence of a crane, the dolly is light enough to be carried manually.

Where it is desired to transport a utility pole 61, the dolly is collapsed to its position shown in FIG. 4. The deck 45 is removed therefrom by removing the draw pins 53, thus to detach the deck together with its links 48. A pole supporting cradle 60 may now be substituted for the transformer carrying deck. Cradle 60 comprises a mast leg 62 having a pair of downwardly extending yokes 63 which will embrace the cross beam 44 on the front wheel frame 12 to be releasably fastened thereto by the bolt 64 which passes through a hole 65 in the web of the beam 44, as shown in FIGURE 8.

The mast leg 62 has a brace 70 pivotally connected thereto on the pintle 66. The end of brace 70 has a foot plate 67 with an aperture 68 which will register over an aperture 69 in the rear axle 16 of the rear frame 11. Bolt 72 is receivable through the respective apertures 68, 69 to hold the brace 70 in place. Thus the rear and front frames are tied together in the retracted position of the reach.

At its upper end, mast leg 62 is provided with a pole support cradle yoke 73 which is desirably swiveled to the mast 62 on a vertical axis and which may have roller arms 74 upon which a pole 61 may be easily shifted for balancing the pole with respect to the support axis of the cradle 60.

Accordingly, the dolly can be readily converted to transport a pole over unpaved terrain or private property to a site where the pole is to be set.

The shortened wheel base of the dolly when collapsed and the pole support cradle is mounted thereon makes the dolly maneuverable for positioning the pole in close quarters.

The various interchangeable parts of the dolly are readily and compactly storable in a truck or warehouse when not in use.

I claim:

1. A collapsible dolly comprising front and rear wheeled frames and an extensible reach interconnecting said frames, a pole support cradle having one leg releasably engageable with one of said frames and another leg releasably engageable with the other said frame when the reach is retracted, to hold said reach against extension when the dolly is collapsed.

2. A collapsible dolly comprising front and rear wheeled frames and an extensible reach interconnecting said frames, a pole support cradle having one leg releasably engageable with one of said frames and another leg releasably engageable with the other said frame when the reach is retracted, to hold said reach against extension when the dolly is collapsed, one of said frames comprising a transverse beam extending laterally at both sides of the reach, said one leg having a pair of yokes each embracing the beam at points spaced therealong.

3. The device of claim 2 in which the said other leg comprises a brace pivotally connected to the said one leg.

4. A multi-use dolly comprising front and rear-wheeled frames and an extensible reach interconnecting said frames, a deck and releasable means supporting said deck on said dolly for bearing one load when the reach is extended to widely space said frames, and a cradle interchangeable with said deck and means for mounting said cradle on said frames when said reach is retracted to narrowly space said frames.

5. The device of claim 4 in which said deck and cradle respectively comprise mounting portions which interconnect said frames against separation when said deck and cradle are respectively mounted on the dolly.

6. The device of claim 4 in which said frames comprise beams substantially at the level of the reach and upon which said deck is directly supported, said cradle having a mast and means for coupling the mast to one of said beams when the cradle is mounted on the dolly.

7. A collapsible dolly comprising front and rear wheeled frames and an extensible reach interconnecting said frames, a pole support cradle having one leg releasably engageable with one of said frames and another leg releasably engageable with the other said frame when the reach is retracted, to hold said reach against extension when the dolly is collapsed, one of said frames comprising a transverse beam extending laterally at both sides of the reach, and means for coupling said one leg to said transverse beam at points spaced therealong.

References Cited in the file of this patent

UNITED STATES PATENTS

| | | |
|---|---|---|
| 353,373 | Newton et al. | Nov. 30, 1886 |
| 647,512 | Nichols | Apr. 17, 1900 |
| 729,394 | Nickerson | May 26, 1903 |
| 1,338,546 | Allen | Apr. 27, 1920 |
| 1,475,069 | Jergesen | Nov. 20, 1923 |
| 1,630,425 | Hartwick | May 31, 1927 |
| 2,174,063 | Richards | Sept. 26, 1939 |
| 2,605,113 | Gilmore | July 29, 1952 |
| 2,657,939 | Beebe | Nov. 3, 1953 |
| 2,727,758 | Smith | Dec. 20, 1955 |

FOREIGN PATENTS

| | | |
|---|---|---|
| 62,562 | Switzerland | Mar. 8, 1927 |
| 335,950 | Switzerland | Mar. 14, 1959 |